(12) United States Patent
Malecki

(10) Patent No.: US 10,928,133 B1
(45) Date of Patent: Feb. 23, 2021

(54) AIR DRYER APPARATUS FOR GARMENTS WITH CONVEYING MECHANISM

(71) Applicant: Pawel Malecki, Oakville (CA)

(72) Inventor: Pawel Malecki, Oakville (CA)

( * ) Notice: Subject to any disclaimer, the term of this patent is extended or adjusted under 35 U.S.C. 154(b) by 93 days.

(21) Appl. No.: 16/431,878

(22) Filed: Jun. 5, 2019

(51) Int. Cl.
| | | |
|---|---|---|
| *F26B 25/00* | (2006.01) |
| *F26B 15/18* | (2006.01) |
| *D06F 57/12* | (2006.01) |
| *B65G 9/00* | (2006.01) |
| *D06F 60/00* | (2009.01) |

(52) U.S. Cl.
CPC .............. *F26B 15/18* (2013.01); *B65G 9/008* (2013.01); *D06F 57/125* (2013.01); *D06F 60/00* (2013.01); *B65G 2201/0229* (2013.01)

(58) Field of Classification Search
CPC ........ F26B 15/18; D06F 57/125; D06F 60/00; B65G 9/008; B65G 2201/0229
USPC ..................... 34/236, 216; 198/835, 303, 710
See application file for complete search history.

(56) References Cited

U.S. PATENT DOCUMENTS

| | | | |
|---|---|---|---|
| 2,788,885 A | | 4/1957 | Begent |
| 3,010,584 A | * | 11/1961 | Rutkovsky ............. B65G 17/20 211/121 |
| 4,774,505 A | * | 9/1988 | Ueda ..................... B61B 10/025 198/464.3 |
| 4,846,356 A | | 7/1989 | Dubuc |
| 2008/0067033 A1 | * | 3/2008 | Fuchs .................... B65G 21/14 198/303 |
| 2016/0046444 A1 | * | 2/2016 | Fenile .................... B65G 39/18 198/687.1 |
| 2019/0248589 A1 | * | 8/2019 | Iwata ..................... B65G 9/008 |
| 2019/0367282 A1 | * | 12/2019 | Stauber ................ B65G 17/485 |

* cited by examiner

*Primary Examiner* — John P McCormack

(74) *Attorney, Agent, or Firm* — Sanchelima & Associates, P.A.; Christian Sanchelima; Alexander J. Rodriguez

(57) ABSTRACT

An air dryer apparatus including a conveying mechanism is disclosed here. The air dryer apparatus comprises of a conveying mechanism adapted to receive garments for air drying. Furthermore, the air dryer apparatus comprises of a tubular structure with a channel slot formed and extending in a lower section along length thereof. The tubular structure is adapted to be mounted on a modular ceiling or a railing arrangement including rails. The air dryer apparatus also comprises one or more rotating assemblies comprising at least one pair of wheels connected via a shaft and a covering provided for the shaft. To continue, the air dryer apparatus further comprises at least one support member extending from the covering and passing through the channel slot, with at least one support member adapted to support hanging of at least one article of clothing thereon. In the air dryer apparatus at least one pair of wheels is configured to travel inside the tubular structure along the length thereof.

9 Claims, 6 Drawing Sheets

AIR DRYER APPARATUS FOR GARMENTS WITH CONVEYING MECHANISM

BACKGROUND OF THE INVENTION

1. Field of the Invention

The present disclosure relates generally to an air dyer apparatus for clothing articles such as garments; and particularly relates to an air dryer apparatus with a conveying mechanism that supports members for hanging clothing articles such as garments for drying thereof, suitable for use in laundry applications.

2. Description of the Related Art

Most modern homes install and utilize electronic dryers for drying of clothing articles and garments after washing thereof. It is appreciated that these dryers provide convenience on part of the user for drying of garments, as the user may simply need to toss in all the washed clothing articles therein and remove the same once dried, as may be indicated thereby. However, these electronic dryers typically consume lot of electricity which may add a hefty amount to the house electricity bills. It may be appreciated that since most of the house electricity comes from non-renewable sources, such electronic devices may indirectly harm the environment. Moreover, it has been found that for some types of clothing material the use of electronic dryers, with mechanical function, may be too harsh as these dryers generally work by vigorously rotating the clothing articles therein, which may possibly damage the clothing article.

Traditionally for the drying of washed clothing articles, an air-drying technique has been employed. In air drying, the clothing articles like garments, after being washed, are hung on some kind of rope or wires, or even rails, or some specialized racks to be dried. Sometimes, hangers are used which may be suspended from any supporting structure. However, because each garment stays in its initially hung position, typically only one side of each garment which is facing the sun may get dried quickly. Thus, the user may have to move and/or rotate the hung garments to let their other sides also face the sun. This may be cumbersome as the user may have to individually do that for each and every hung clothing article. Moreover, this is in addition to the fact that even for hanging the garments on a rope or the like at the first place, requires the user to walk along the length of the rope so as to distribute clothing articles for proper drying thereof. All of this may be excruciating and tiring for the user.

There have been some known designs for air dryers which provides a little convenience to the users; however, these designs suffer from their own drawbacks. For instance, U.S. Pat. No. 2,788,885 discloses a conveyor with reciprocating mechanism to move clothes hangers along a supporting member. The disclosed conveyor includes depending fingers which engage clothes hangers and are supported on a lower member, and the depending fingers are pivotally mounted on a reciprocating cable so that the fingers intermittently move the hangers forward, and then tilt as the cable moves backward to slide over one hanger and to pick up the next successive spaced hanger, being moved along the assembly. Such arrangement is complex and cumbersome for the user.

U.S. Pat. No. 4,846,356 discloses drying rack for clothes adapted to be fixed to a ceiling and between lateral walls surrounding a bathtub. It includes a rectangular frame having cross-bars secured to the frame. The frame is supported to the ceiling by a pair of brackets having a flange in the plane of the frame. Each bracket is mounted on two opposite long sides of the frame. The frame is also supported by two pairs of S-shaped hooks mounted on the two opposite short side of the rectangular frame. These hooks have an eyelet at each end. The eyelets are twisted in planes perpendicular from each other. Such drying rack may be handy but may still require effort on part of the user to reach to the brackets and hooks distributed therein for hanging of clothes, which may be cumbersome. Such drying rack needs large space which may not always be practical.

Accordingly, it would be desirable to have an air dryer apparatus for garments which is simple to use and is convenient for the user. Documents describing the closest subject matter provide for a number of more or less complicated features that fail to solve the problems described above in an efficient and economical way. None of the documents suggest the novel features of the present invention.

SUMMARY OF THE INVENTION

It is one of the objectives of the present invention to provide an air dryer with a conveying mechanism that can be utilized for moving clothes hung therein.

It is another objective of the present invention to provide an air dryer which can easily be installed or mounted on a modular ceiling or rails in a household without occupying too much space.

It is yet another objective of the present invention to provide an air dryer which is simple to use and inexpensive to manufacture.

Further objects of the invention will be brought out in the following part of the specification, wherein detailed description is for the purpose of fully disclosing the invention without placing any limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Illustrative embodiments of the present invention are described below. The following explanation provides specific details for a thorough understanding of and enabling description for these embodiments. One skilled in the art will understand that the invention may be practiced without such details. In some instances, well-known structures, processes and functions have not been shown or described in detail to avoid unnecessarily obscuring the description of the embodiments.

It shall be noted that unless the context clearly requires otherwise, throughout the description, the words "comprise," "comprising," "include," "including," and the like are to be construed in an inclusive sense as opposed to an exclusive or exhaustive sense; that is to say, in the sense of "including, but not limited to." Words using the singular or plural number also include the plural or singular number, respectively while adhering to the concepts of the present invention. Furthermore, references to "one embodiment" and "an embodiment" are not intended to be interpreted as excluding the existence of additional embodiments that also incorporate the recited features.

Figure 1:
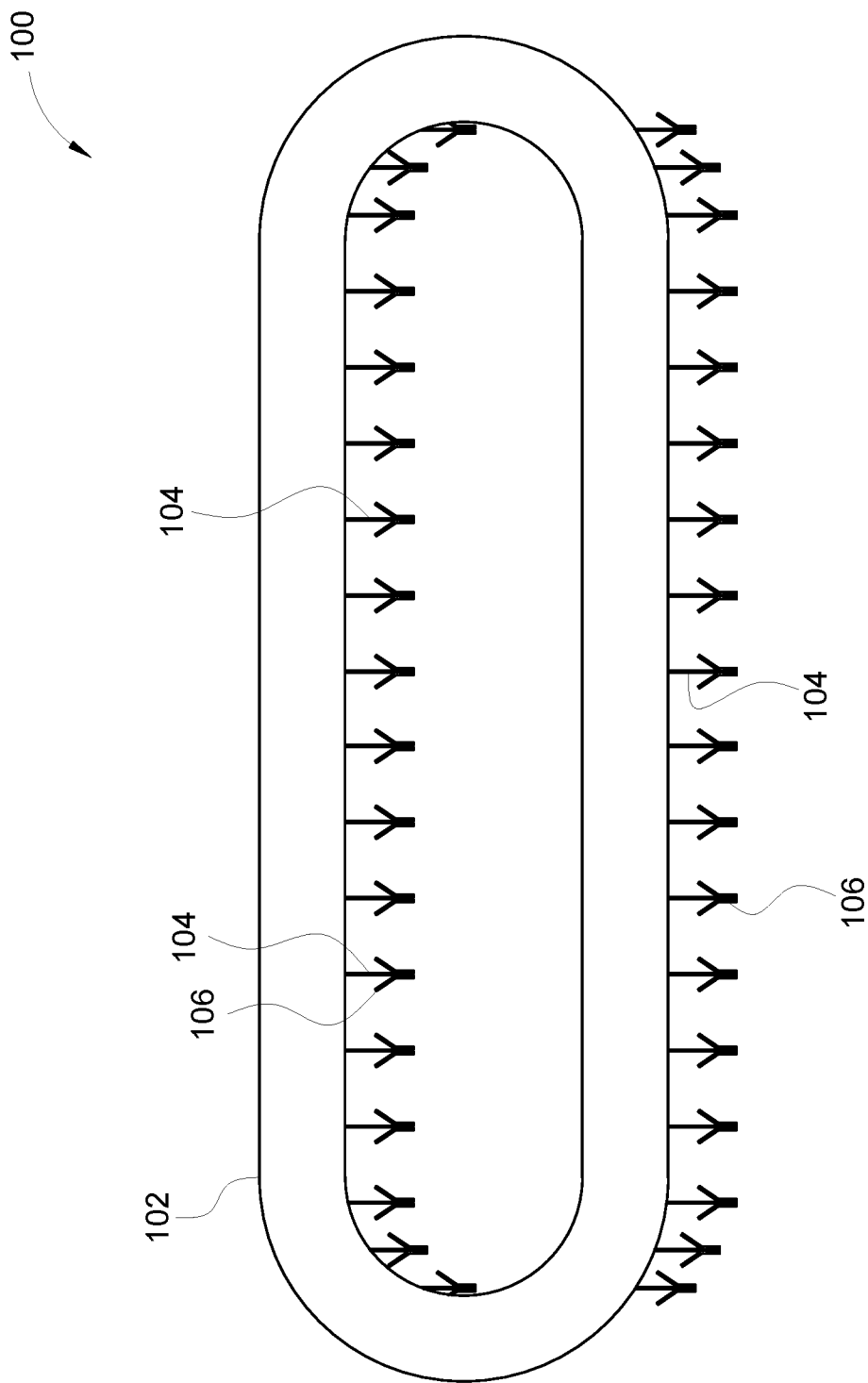
FIG. 1 illustrates a diagrammatic isometric perspective view of an air dryer apparatus 100, in accordance with one or more embodiments of the present invention.

Referring to the drawings, FIG. 1 illustrates a diagrammatic isometric perspective view of an air dryer apparatus (generally designated by the numeral 100), in accordance with one or more embodiments of the present disclosure. The air dryer apparatus 100 may be employed for the drying of clothing articles, such as garments, in open air. For this purpose, the washed garments, which may still be wet with water, are hung in the air dryer apparatus 100. The air dryer apparatus 100 may be installed in some open space to let the wet garments get dried due to air movement. The air dryer apparatus 100 can also be implemented for transporting of clothing articles from one place to another, for example in a professional laundry or dry-cleaning shop. The air dryer apparatus 100 can further be implemented for clothing storage and conveyor systems or rack installations of the kind used for temporarily storing articles of clothing, for instance in public places such as restaurants, theaters, auditoriums, to store away their overcoats, hats and the like.

As illustrated in FIG. 1, the air dryer apparatus 100 includes a tubular structure 102. The tubular structure 102 may be in the form of an oval shaped pipe which may be closed in the form of a loop. Although, the tubular structure 102 is shown to be shaped oval, it may be appreciated that the tubular structure may have any closed geometry or even an open geometry for the purposes of the present disclosure without departing from the scope of the present disclosure. In the present embodiments, the tubular structure 102 may generally be made of any strong and light material, such as plastic or any suitable polymer, like Polyvinyl Chloride (PVC), or even as metallic pipe without any limitations. In some examples, the tubular structure 102 may be provided with cross-bars or corrugation on outer surface thereof to add strength thereto and enhance its load carrying capacity, as may be needed to support multiple wet garments thereby (as discussed further).

Also, as illustrated, the air dryer apparatus 100 includes support members 104 which may be extending outwardly in generally downward direction from the tubular structure 102. The support members 104 are utilized to hang the clothing articles in the air dryer apparatus 100. In some embodiments, the support members 104 are in the form of hooks or the like which allow to suspend garments therefrom without need of any additional component. For example, the support members 104 may be made of a thin metallic wire which may be curved at one end to provide a hook portion onto which clothing items could be suspended. In an embodiment, as illustrated, each of the support members 104 may be provided with a clip 106 which can be used to hold the clothing articles. Such clips are well known and are readily available in the market, and thus have not been described herein for the brevity of the present disclosure.

Figure 2:
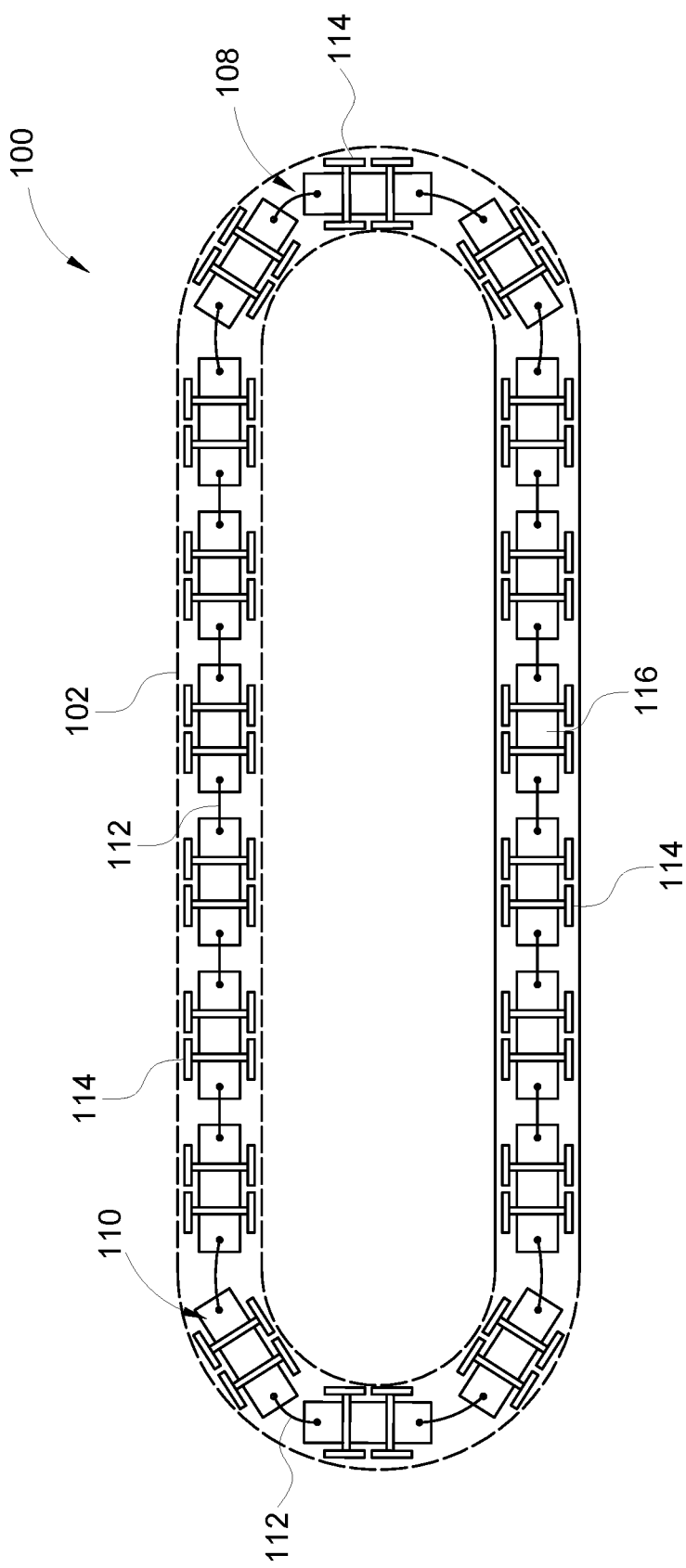
FIG. 2 illustrates a diagrammatic top planar view of the air dryer apparatus 100 with its tubular structure 102 removed for showing internal components thereof, in accordance with one or more embodiments of the present invention.
Figure 3:
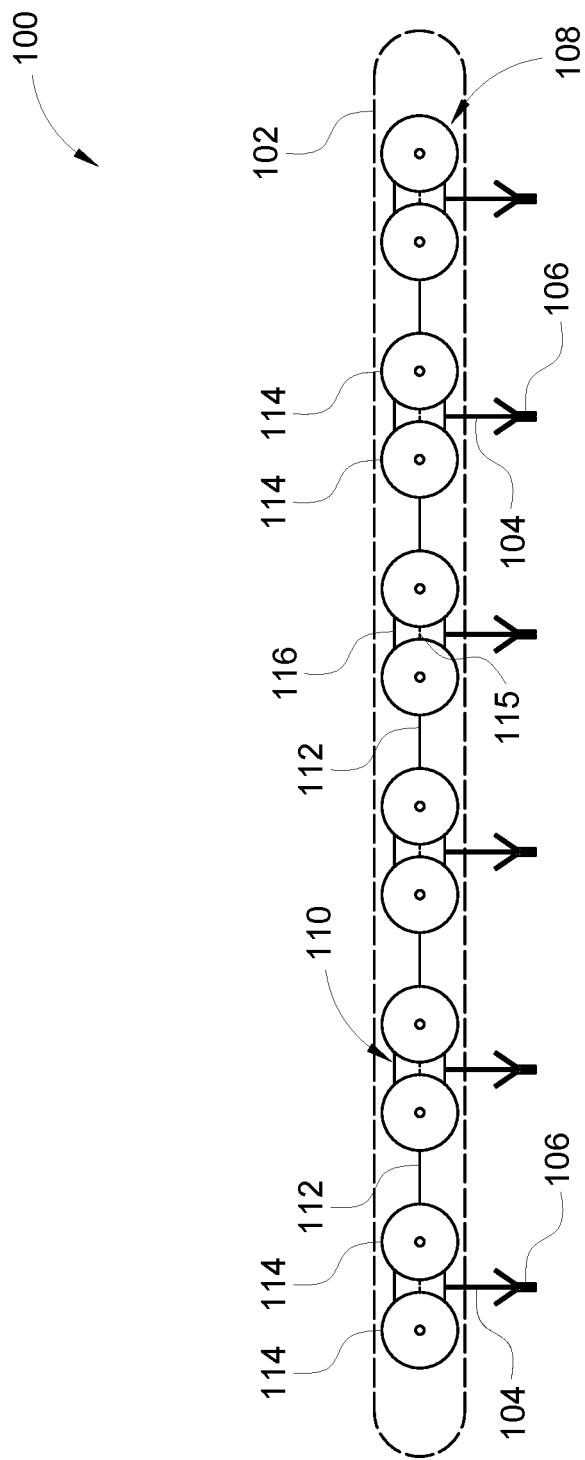
FIG. 3 illustrates a diagrammatic side planar view of a portion of the air dryer apparatus 100 with its tubular structure 102 removed for showing internal components thereof, in accordance with one or more embodiments of the present invention.

FIGS. 2-3 illustrate the air dryer apparatus 100 with the tubular structure 102 shown in dashed lines and its internal components being visible. As illustrated, the air dryer apparatus 100 includes a conveying mechanism 108 arranged inside the tubular structure 102. The conveying mechanism 108 includes a plurality of rotating assemblies 110 which are coupled to each other by one or more cords 112 or the like, to form a rail-like instrument. It may be seen that the plurality of rotating assemblies 110 are arranged inside the internal hollow region of the tubular structure 102 and are sized to generally accommodate into the circumferential area of the tubular structure 102. In an embodiment of the present disclosure, each of the plurality of rotating assemblies 110 may include two pairs of wheels 114, and each of the pair of wheels 114 includes two wheels rotatably connected to each other by a shaft 115 or the like (as discussed later). Further, each of the plurality rotating assemblies 110 may include a covering 116 for said shafts. Furthermore, the support members 104 are attached to the said covering 116 and extend therefrom. It may be appreciated that in the illustrations of FIGS. 2-3, the plurality of rotating assemblies 110 are shown diagrammatically, and such shape and design shall not be construed as limiting to the present disclosure.

Figure 4:
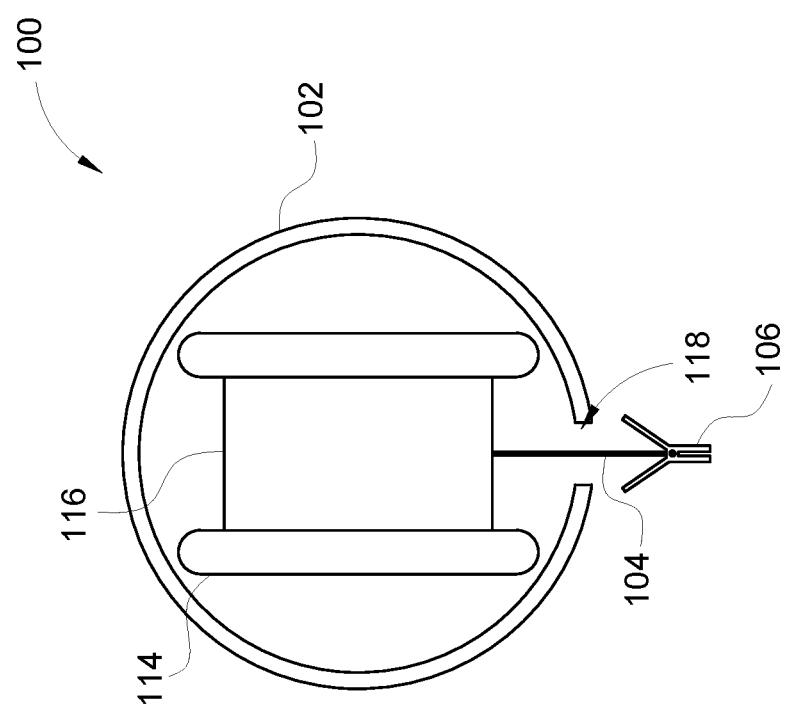
FIG. 4 illustrates a diagrammatic front sectional view of the air dryer apparatus 100, in accordance with one or more embodiments of the present invention.

FIG. 4 illustrates a diagrammatic front sectional view of the air dryer apparatus 100. As may be seen, the tubular structure 102 includes a channel slot 118 formed in a lower section thereof. The channel slot 118 is extending along the length of the tubular structure 102. The support members 104, attached to the rotating assemblies 110, extend through the channel slots 118 to be available external to the tubular structure 102 for hanging clothing articles thereto. It may be contemplated that the clips 106 are attached to portions of the support members 104 outside that of the tubular structure 102. The channel slot 118 may be wide enough to allow the support members 104 to pass therethrough yet narrow enough to support rim of the wheels 114 of the rotating assemblies 110 to be supported at the inside surface of the tubular structure 102, for allowing movement along thereof.

According to one or more embodiments, the wheels 114 in the rotating assemblies 110 may have dimensions with diameter of about 30 millimeters. In some examples, the wheels 114 may be designed to have a hub and spoke structure which is very common design choice for such wheels in the art. Further, the shaft 115 connecting the two wheels 114 may be about 26 millimeters in length, and the two wheels 114 may be separated from each other by about 15 millimeters. Accordingly, the tubular structure 102 may be designed and dimensioned to accommodate such rotating assemblies 110 with its corresponding components. In some embodiments, the air dryer apparatus 100 may include electric motors (not shown) to propel the rotating assemblies 110. For example, each of the rotating assemblies 110, or pair of wheels 114 therein, may be provided with an independent small motor to provide propagation thereto. Alternatively, a single motor can be coupled to one of the rotating assemblies 110 which can provide motive force to pull all the other rotating assemblies 110 along therewith, as all the rotating assemblies 110 are rigidly connected to each other by the cord 112.

Figure 5:
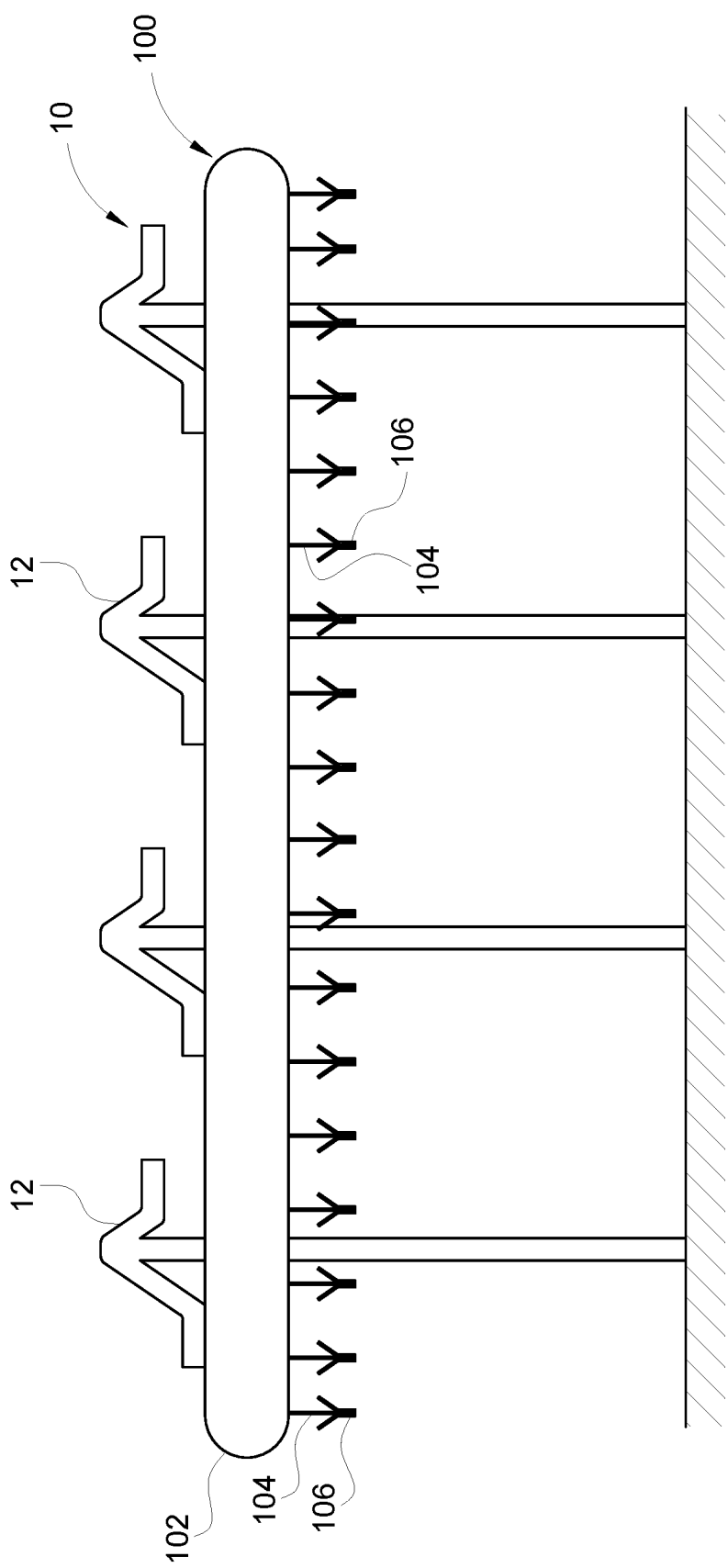
FIG. 5 illustrates a diagrammatic view of the air dryer apparatus 100 installed on a railing arrangement 10, in accordance with one or more embodiments of the present invention.

The air dryer apparatus 100 can be installed for use in homes or apartment balcony. The air dryer apparatus 100 can be mounted in dryer rooms or attic, or generally any space or room of choice without any limitations. The air dryer apparatus 100 can also be installed in backyard or the like, as desired. Referring to FIG. 5, as illustrated, the air dryer apparatus 100 is shown to be mounted on a railing arrangement 10. In particular, the air dryer apparatus 100 is supported on rails 12 of the railing arrangement 10. It may be contemplated that the air dryer apparatus 100 may wrap around the rails 12 and mounted thereto by some fastening means, such as screws, etc., to be secured to the railing arrangement 10. In other examples, the air dryer apparatus 100 may be mounted on a modular ceiling or any other fixed structure without any limitations. In yet other examples, the air dryer apparatus 100 have stands or legs extending from ends of the tubular structure 102, which may support the air dryer apparatus 100 on the ground.

Figure 6:
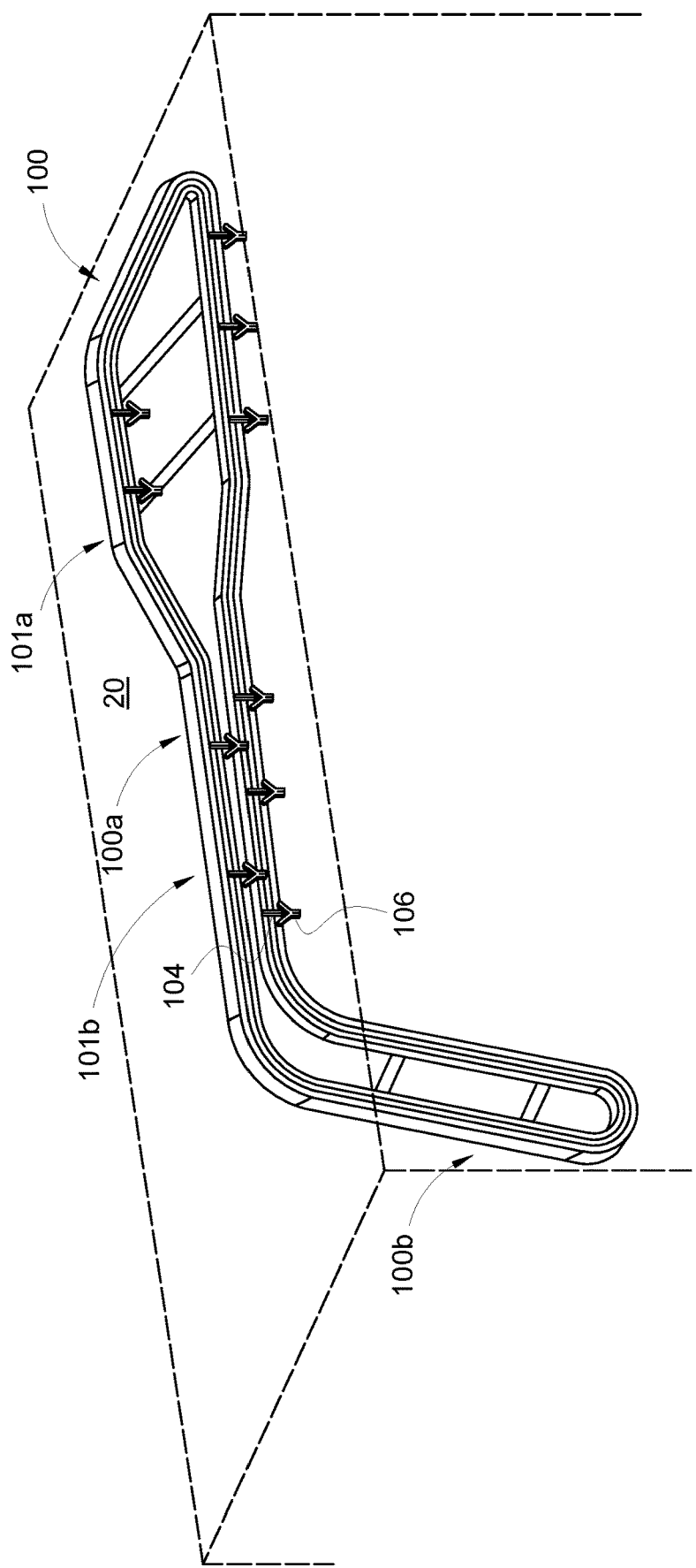
FIG. 6 illustrates a diagrammatic view of the air dryer apparatus 100 installed on a modular ceiling 20, in accordance with one or more embodiments of the present invention.

Referring to FIG. 6, as illustrated, the air dryer apparatus 100 is shown to be installed with a modular ceiling 20. The air dryer apparatus 100 is shown to have shape suitable for mounting to the modular ceiling 20 yet still be accessible by a person of an average height to put clothes for drying purposes. In an embodiment, such air dryer apparatus 100 may include a first portion 100*a* which may be fixed to the modular ceiling 20, a second portion 100*b* which may be extending downward from the modular ceiling 20. In some examples, as shown, the first portion 100*a* may have a wide section 101*a* and a narrow section 101*b*, so that the wide section 101*a* can provide larger space for putting more clothes for drying in the air dryer apparatus 100. It may be appreciated by a person skilled in the art that the person using air dryer apparatus 100 of FIG. 6, may use clips 106 at the second portion 100*b* to first hang clothes and then utilize the conveying mechanism 108 to move the clipped clothes from the second portion 100*b* to the first portion 100*a*, such that other clips 106 are made available at the second portion 100*b* to hand more clothes; and the steps may be reversed to remove the clothes from the air dryer apparatus 100, for instance when the clothes have been dried sufficiently.

The air dryer apparatus 100 of the present disclosure does not require any electricity for drying of garments in contrast to electric dryers as known in the art and is generally eco-friendly and safe to use without the risk of any potential fire hazard or the like. As discussed, the air dryer apparatus 100 can be used for conveyor-type handling of clothing articles as well as for also general purpose storing and handling of products. With its versatility and ease of installation, the air dryer apparatus 100 can be utilized for home as well as professional applications. For example, in professional setting, such apparatus 100 eliminates the need of direct manual carrying of the articles or transporting the articles through the manual propulsion of a portable rack, thus reducing labor and time and thereby the cost of service.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense in any manner.

What is claimed is:

1. An air dryer apparatus, comprising:
    a conveying mechanism adapted to receive garments for air drying;
    a tubular structure with a channel slot formed and extending in a lower section along the length thereof;
    a plurality of rotating assemblies comprising at least one pair of wheels connected via a shaft and a covering provided for the shaft; and
    at least one support member extending from the covering and passing through the channel slot, with at least one support member adapted to support hanging of at least one article of clothing thereon,
    wherein at least one pair of wheels is configured to travel inside the tubular structure along the length thereof.

2. The air dryer apparatus of claim 1 further comprising at least one clip fixed to a free end of the at least one support member, wherein the at least one clip allows supporting of the at least one article of clothing therewith.

3. The air dryer apparatus of claim 1 further comprising one or more cords rigidly connecting the one or more rotating assemblies inside the tubular structure.

4. The air dryer apparatus of claim 3, wherein the one or more cords are fixed to the covering in the rotating assemblies.

5. The air dryer apparatus of claim 1, wherein the tubular structure is in the form of an oval shaped pipe.

6. The air dryer apparatus of claim 1, wherein the covering extends over and envelops the shaft such that the shaft is rotatable with the corresponding pair of wheels inside the covering.

7. The air dryer apparatus of claim 1, wherein the tubular structure is made of plastic.

8. The air dryer apparatus of claim 1, wherein the tubular structure is adapted to be mounted to a fixed arrangement such as a modular ceiling or a railing arrangement including rails.

9. The air dryer apparatus of claim 1 further including, a first portion, a second portion, a wide section, and a narrow section.

* * * * *